United States Patent
Colgan et al.

(10) Patent No.: US 6,791,639 B2
(45) Date of Patent: Sep. 14, 2004

(54) DIRECT VIEW DISPLAY WITH LENTICULAR LENS FOR IMPROVED BRIGHTNESS AND WIDE VIEWING ANGLE

(75) Inventors: Evan George Colgan, Chestnut Ridge, NY (US); Fuad Elias Doany, Katonah, NY (US); Rama Nand Singh, Bethel, CT (US); Masaru Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 10/144,996

(22) Filed: May 14, 2002

(65) Prior Publication Data

US 2003/0214615 A1 Nov. 20, 2003

(51) Int. Cl.[7] .......................... G02F 1/1335; F21V 7/04
(52) U.S. Cl. ............................. 349/95; 349/61; 349/63; 349/65; 362/31
(58) Field of Search ............................... 349/61–65, 95; 362/26, 31

(56) References Cited

U.S. PATENT DOCUMENTS

| | | | | |
|---|---|---|---|---|
| 4,798,448 A | | 1/1989 | van Raalte | 349/62 |
| 5,151,801 A | * | 9/1992 | Hiroshima | 349/95 |
| 5,276,538 A | * | 1/1994 | Monji et al. | 349/95 |
| 5,280,371 A | * | 1/1994 | McCartney et al. | 349/64 |
| 5,561,538 A | * | 10/1996 | Kato et al. | 349/5 |
| 5,598,281 A | | 1/1997 | Zimmerman et al. | 349/5 |
| 5,600,462 A | * | 2/1997 | Suzuki et al. | 349/112 |
| RE35,704 E | | 12/1997 | Chiba et al. | 359/619 |
| 5,711,589 A | | 1/1998 | Oe et al. | 362/31 |
| 5,863,113 A | | 1/1999 | Oe et al. | 362/31 |
| 5,926,601 A | | 7/1999 | Tai et al. | 349/62 |
| 6,011,601 A | * | 1/2000 | Kojima | 349/62 |
| 6,086,212 A | | 7/2000 | Onishi et al. | 362/31 |
| 6,164,790 A | | 12/2000 | Lee | 362/31 |
| 6,220,741 B1 | | 4/2001 | Kawachi et al. | 362/26 |
| 6,474,827 B2 | * | 11/2002 | Shinohara et al. | 362/31 |
| 6,600,528 B2 | * | 7/2003 | Colgan et al. | 349/95 |

OTHER PUBLICATIONS

Kalantar et al., "34.2: Functional Light–Guide Plate for Backlight Unit," SID 99 Digest, pp. 764–767.
Kalantar et al., "43.2: Optical Micro Deflector Based Functional Light–Guide Plate for Backlight Unit," SID 00 Digest, pp. 1029–1031.
McFarland et al., "S32–4 Invited SpectraVue™ Viewing Angle Enhancement System for LCDs," Asia Display 1995, pp. 738–742.
Zimmerman et al., "36.2: Viewing–Angle–Enhancement System for LCDs," SID 95 Digest, pp. 793–796.
U.S. patent appln. Ser. No. 09/711,041 filed Nov. 13, 2000 entitled "Highly Collimating Tapered Light Guide for Uniform Illumination of Flat Panel Displays".

* cited by examiner

Primary Examiner—Tarifur R. Chowdhury
(74) Attorney, Agent, or Firm—Robert M. Trepp (57) ABSTRACT

In a liquid crystal display device of a direct view type, a lenticular lens sheet is provided in the backside of a liquid crystal display panel. Light emitted to a lens of the lenticular lens sheet is first converged in the liquid crystal display panel, and then diffused. When the light is emitted from the liquid crystal display panel, the radiation distribution thereof is widened. Thus, a bright display screen even when seen from a wide angle can be realized.

10 Claims, 8 Drawing Sheets

DIRECT VIEW DISPLAY WITH LENTICULAR LENS FOR IMPROVED BRIGHTNESS AND WIDE VIEWING ANGLE

BACKGROUND

1. Technical Field

The present invention is generally directed to a LCD (liquid crystal display) panel and device for use in a portable personal computer (PC). In particular, the present invention is directed to a LCD panel and LCD device that provides improved brightness and viewing angle of light emitted from a portable LCD panel.

2. Description of Related Art

There has been remarkable progress in the use of liquid crystal display devices as image displays for PCs and various other applications. The liquid crystal display devices of this kind are typically constructed such that a backlight unit, which comprises a planer light source for illumination from the backside of the liquid crystal display panel, illuminates an entire liquid crystal layer having a given expanse with light having a uniform brightness thereon, wherein an image formed in the liquid crystal layer is made visible using polarizing sheets.

This backlight design typically employs a HCFL (hot-cathode fluorescent lamp) or a CCFL (cold-cathode fluorescent lamp) as the light source. Light from so-called "linear light source" such as a fluorescent tube must be projected onto the full surface of the liquid crystal display panel, and two general configurations for the backlight have been developed: (i) a directly-below type; and (ii) a side light type (edge lit type). A directly-below backlight unit employs one or more fluorescent tubes disposed directly below the LCD panel, with a light control plate and a diffusing plate disposed between the fluorescent tube(s) and the LCD panel.

A side light type unit has a fluorescent tube along one or two sides of a light guide plate that is made of a transparent resin. The light guide plate directs light incident on the edges of the light guide plate toward the surface of the liquid crystal display panel by reflecting microstructured portions formed on the backside of the light guide plate. This backlight design is suitable for use as a display device for portable equipment such as a notebook PC or the like, since it can be made thin as compared to a backlight device comprising a directly-below structure.

A desired characteristic for a liquid crystal display device is that the display be bright even from a wide viewing angle. One method of increasing the brightness of the screen is to increase the luminance of the backlight. Increasing the backlight luminance, however, has the disadvantage of increased power consumption, especially in the case of battery powered portable equipment, wherein power consumption should be limited.

Typically, to increase the viewing angle of a display, a diffusing plate is used in the liquid crystal device. The diffusing plate redistributes light from the light guide plate as light having a wider angular distribution. A diffusing plate comprises a light diffusing layer, made of a light transmissive resin and light scattering particles such as acrylic particles, silica particles or the like, on or in the surface of a transparent substrate such as a PET film. When light emitted from a light source (such as a fluorescent tube or the like) is transmitted through the diffusing plate, however, the luminance is substantially reduced. Consequently, by removing the diffusing plate, the luminance, or brightness, of the liquid crystal display device can be increased.

As noted above, however, the diffusing plate provides an important function of increasing the angular distribution of the light from the backlight to provide a wider viewing angle. Thus, it is not desirable to remove the diffusing plate.

There are patents that disclose the use of lenticular lens sheets in conjunction with liquid crystal displays. This use of microlens has generally been directed toward projection displays (see, U.S. Pat. Nos. 5,764,319, 5,548,349, and 5,859,675), especially for "color-filterless" projection displays where a lenticular sheet with a lens pitch equal to the pixel pitch is used to focus and direct Red, Green, and Blue light which are incident on the lenticular sheet from different angles through spatially separate Red, Green, and Blue subpixels in the display.

A color filterless backlight system for direct view LCDs is described in U.S. Pat. No. 4,798,448 and U.S. patent application Ser. No. 09/664,719 filed Sep. 19, 2000, entitled "FLAT BACKLIGHTING SYSTEM", which is commonly assigned and incorporated herein by reference. U.S. Pat. No. 5,101,279 to Kurematsu et al. describes using a lenticular sheet in combination with a LCD to increase the amount of light transmitted through the open aperture. In this patent, the longitudinal axes of the cylindrical lenses comprising the lenticular extends in the direction of the optical switching portion (open aperture) dimension of greater distance. This configuration has a number of disadvantages. Nearly all LCDs use a vertical triad structure, i.e., each pixel is composed of a Red, Green, and Blue subpixel, each of which extends vertically across the whole of a square pixel and occupies $\frac{1}{3}$ of the pixel area in the horizontal direction. For the configuration described by Kumematsu et al., the lenticular longitudinal axis would be vertical and the pitch would equal $\frac{1}{3}$ of the pixel pitch. It would be advantageous to make the pitch of the lenticular equal to the pixel pitch (and not the subpixel pitch) since less precision is needed in forming and aligning the lenticular sheet to the display. If a vertical lenticular is placed behind the display, and no additional structure is added to the front, the width of the output light distribution would be increased in the horizontal direction, but be unchanged in the vertical direction.

It is typical for notebook displays to use a tapered light guide with the CCFL along the top or bottom edge of the display. This is advantageous since nearly all displays are used in a "landscape" mode so the top or bottom edge is longer than the side edges. Thus, placing a single CCFL along the longer edge results in a brighter display than placing a single CCFL along the shorter edge. As described below, with a tapered light guide having the CCFL along the bottom (or top) edge, the light output distribution in the vertical direction can be adjusted to be much less than that in the horizontal direction, so having a vertical lenticular present which further increases the width of the output light distribution in the horizontal direction is very undesirable.

SUMMARY OF THE INVENTION

It is an object of the present invention is to provide a liquid crystal display panel and a liquid crystal display device capable of improving the brightness and viewing angle of the light emitted from a portable liquid crystal display panel.

In one aspect of the present invention, a display panel for a direct view display device comprises: a first substrate comprising a light transmissive material for receiving light emitted from the light source; a second substrate comprising a light transmissive material for receiving light transmitted through the first substrate and emitting the light from an image display screen thereof; an optical device layer, disposed between the first and second substrates, comprising an optical device for controlling light emitted from the light source; and light converging means for converging the light emitted from the light source on the optical device layer.

The light converging means preferably converges light emitted from the light source onto the optical device layer so that the converged light can be transmitted through the optical device layer without being blocked, e.g., by scanning lines. Further, the focusing of light in one dimension increases the angular width of the output distribution in that direction, which increases the viewing angle without using diffusing plates. In other words, since light having a wide angular distribution can be emitted from the display panel without using any diffusing plates, unlike the conventional method, it is possible to increase the luminance while maintaining adequate brightness off the display normal to provide a wide viewing angle. In addition, by properly setting the converging position (or focal point) of the converging means, it is possible to partially prevent the reduction in transmission of light due to light blocking portions of a TFT panel.

In another aspect of the present invention, the display panel comprises a plurality of pixels arrayed in a dot matrix form and the light converging means is preferably formed to correspond to columns of the pixels or, alternatively, to rows of the pixels. In a preferred embodiment, the light converging means comprises a plurality of lenticular lenses, wherein one lenticular lens is provided for each column or row of pixels. In another embodiment, the light converging means comprises a fly-eye lens.

In another aspect of the present invention, a LCD (liquid crystal display) panel comprises: an array substrate comprising rectangular pixels in a matrix form, each of the pixels comprising a pair of long sides and a pair of short sides; a color filter substrate; a liquid crystal layer disposed between the array substrate and the color filter substrate; and a plurality of lenticular lenses extending along the short sides of the pixels for converging light to desired locations within the LCD panel, wherein the lenticular lenses are disposed on a surface side of the array substrate that receives light from a light source and wherein the lenticular lenses are disposed such that a boundary between adjacent lenticular lenses is substantially arranged along the short sides of pixels.

Preferably, with the LCD panel, the light is first converged by the lenticular lens to a location between the array substrate and the color filter substrate, then transmitted through the color filter substrate while being diffused with a predetermined angle, transmitted through a polarizing plate of the LCD panel, and then emitted with an angle that is greater than the predetermined angle.

In a liquid crystal display panel of the invention, preferably, each of the lenticular lenses focuses the light in the liquid crystal layer and each of the lenticular lenses preferably focuses light within a range of projection surfaces of the pixels such that light is prevented from being blocked by scanning lines formed on the array substrate. In other words, irrespective of an open area ratio, the luminance of the liquid crystal display panel can be enhanced.

A liquid crystal display panel according to the present invention may be implemented in a direct-view liquid crystal display device to increase luminance and viewing angle. In such a case, a gap between a pair of short sides of a pixel is set in a range of about 100 micrometers to about 300 micrometers.

In another aspect of the present invention, a liquid crystal display device comprises: a liquid crystal display panel comprising a liquid crystal layer and an image display screen; a light source for emitting a light to the liquid crystal display panel; and a lens disposed between the liquid crystal display panel and the light source for converging the light emitted from the light source inside the liquid crystal display panel, wherein the light emitted from the light source is converged inside the liquid crystal display panel, then diffused with a first angle, and emitted from the image display screen with a second angle that is greater than the first angle.

A liquid crystal display panel and device according to the present invention can advantageously emit light having a wide radiation distribution, without having to employ diffusing plates to obtain such wide radiation distribution. The lens converges light emitted from the light source on the liquid crystal layer or, alternatively in the vicinity thereof, and then the converged light is diffused with a first angle, and then emitted from the image display screen with a second angle that is larger than the first angle.

Preferably, in a liquid crystal display device of the invention, a half-value width (an angle at which luminance is half of the maximum luminance) of the light emitted from the image display screen is set larger than a half-value width of the light emitted from the light source in one direction. Specifically, the angle is preferably increased in the direction perpendicular to the lenticular lens axis.

In addition, in a liquid crystal display device of the invention, a half-value width of the light emitted from the light source is preferably set in a range from about −15 degrees to about −5 degrees on one side of the normal direction and in the range of about 5 degrees to about 15 degrees on the opposite side of the normal.

Further, in a liquid crystal display device of the invention, a half-value width of the light emitted form the image display screen is preferably set in a range of about −30 degrees to about −15 degrees on one side of the display normal and in the range of about 15 degrees to about 30 degrees on the opposite side of the normal.

In another aspect of the invention, the liquid crystal display device further comprises: a light guide plate for guiding the light emitted from the light source to the liquid crystal display panel, the light guide plate comprising a light bending structure formed in a light emission surface thereof; a light bending sheet, disposed between the light guide plate and the liquid crystal display panel, comprising a light bending structure formed in a surface facing the light emission surface of the light guide plate that intersects with the light bending structure formed in the light guide plate; and a lenticular lens disposed in a surface of the liquid crystal display panel facing the light bending sheet.

In this embodiment, preferably, the liquid crystal display panel does not have a lens structure on the image display screen side. Further, the light bending structure (e.g., a prism structure) of the light guide plate is preferably formed in a light advancing direction in the light guide plate.

In another aspect of the invention, a liquid crystal display device comprises: a liquid crystal display panel comprising an array substrate comprising a plurality of signal lines for supplying display signals and a plurality of scanning lines for supplying scanning signals, wherein the signal and scanning lines are arrayed in a matrix form, a color filter substrate disposed oppositely to the array substrate with a predetermined gap therebetween, and a liquid crystal layer disposed in the gap; a light guide plate, disposed in a backside portion of the liquid crystal display panel, comprising at least one light incident surface and a light emission surface for emitting a light made incident from the light incident surface; a lamp disposed along the light incident surface of the light guide plate; and a plurality of lenticular lenses disposed between the light guide plate and the liquid crystal display panel and extending in a direction parallel to the scanning lines.

In a liquid crystal display device of the invention, light emitted from the lamp is projected through the light guide plate onto the lenticular lens. The light projected on the lenticular lens is converged within the range of the array substrate to the color filter substrate. The converged light is diffused with a predetermined angle, and emitted to the outside of the liquid crystal display panel after the passing through the color filter substrate. In this case, the emitting light is radiated with a wider angle because of a difference in refractive indices between the liquid crystal display panel and air.

Further, in a liquid crystal display device of the invention, the array pitch of the plurality of lenticular lenses preferably coincides with the pitch of the scanning lines. In addition, the light emission surface of the light guide plate preferably comprises a plurality of prisms that extend in a direction parallel to a light advancing direction in the light guide plate, and the light bending sheet is preferably disposed between the light guide plate and the lenticular lenses, wherein the light bending sheet comprises a plurality of prisms that extend in a direction perpendicular to the light advancing direction in the light guide plate. In this way, the degree of convergence of light projected to the lenticular lens can be increased.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

The present invention is directed to a LCD panel and LCD device that provides improved brightness and viewing angle of light emitted from a portable LCD panel. The following studies and findings provide a framework for constructing a liquid crystal display panel and device according to the present invention.

As noted described above, one method for improving the brightness of the liquid crystal display device is removing the diffusing plate, which causes a reduction in the viewing angle. It has been determined, however, that it is not essential that the angular distribution of the light be increased (via a diffusing plate) prior to the light being incident on the liquid crystal display panel. Indeed, as explained in detail below, the light emitted from the liquid crystal display panel according to the present invention can have the desired angular distribution to provide the desired viewing angle characteristics without using a diffusing plate.

In a preferred embodiment of the present invention, a liquid crystal display panel comprises two glass substrates, each about 0.7 mm in thickness, which are joined together to encapsulate a layer of a liquid crystal material to make an optical device. A color thin film transistor (TFT) type liquid crystal display device comprises one glass substrate which is the TFT array substrate, and another glass substrate which is the color filter substrate. On the outside surface of each of the array and color filter substrates, a polarizing plate is laminated. Light from the backlight is passed sequentially through the bottom polarizing plate, the TFT array substrate, the LC layer, the color filter substrate and the top polarizing plate, and then emitted to the viewer.

A diffusing plate is not needed when the light having a wide angular distribution is transmitted through the front polarizing plate laminated onto the color filter substrate. Indeed, the polarizing plate laminated on the color filter substrate and air have different refractive indices, with the polarizing plate having a larger refractive index. Accordingly, if light transmitted from the polarizing plate has an angle with respect to the display normal, the light will have a larger angle with respect to the display normal after it leaves the polarizing plate and propagates in the air.

Further, to increase the angular distribution of the light without using a diffusing plate, the present invention preferably employs a light converging means, e.g., a lenticular lens. Specifically, for example, by disposing the lenticular lens having a focal point on either the liquid crystal layer, on the light incident surface of the array substrate, or on the bottom polarizer, and passing the light emitted from the backlight unit through the lenticular lens, the light is converged, or focused, inside the liquid crystal display panel, e.g., on the liquid crystal layer. The use of the lenticular lens results in an increase in the angular distribution of the light in the direction perpendicular to the longitudinal axis of the lenticular lens.

The convergence, or focusing, of the light onto the liquid crystal layer has an additional advantage in that it increases the luminance of the emitted light. On the array substrate, a TFT and wiring such as a signal line and a scanning line for driving the TFT are formed. These portions block, or obstruct the transmission of light in the LCD panel and are referred to herein as "light blocking" portions. With higher resolution liquid crystal display devices, the ratio of the area for the TFT, the signal line and the scanning line to the total area is increased. Consequently, the fraction of the area which passes light, i.e., the open area, or aperture ratio, is reduced. The reduction of the open area ratio in turn brings about a reduction in the luminance of a conventional liquid crystal display device. In accordance with the present invention, by directing the light emitted from the backlight through the open area (where transmission is not blocked by the TFT, the signal line, or the scanning line) wherein it can be passed through the liquid crystal display panel, a reduction in the open area ratio does not cause any reductions in luminance.

As described herein, the use of e.g., a lenticular lens enables the light to be converged onto, e.g., the liquid crystal layer. If this converging position is aligned to focus the light midway between the adjacent scanning lines (i.e., in a pixel), a portion of the light which was previously blocked by the scanning lines can now be transmitted by the liquid crystal display panel. Preferably, the light in the direction in which it is converged, or focused, by the lenticular lens is collimated to a certain degree so that the width of the region that the light occupies when it is focused on the liquid crystal layer is less than the spacing between the scanning lines. Thus, in accordance with the present invention, assuming that the same light source is used and it is initially somewhat collimated, it is possible to achieve a higher luminance level in a LCD device according to the present invention using, e.g., a lenticular lens as compared to a conventional liquid crystal display device.

Recently, side light backlight units for portable displays have been proposed which use a prism bending sheet (see U.S. Pat. Nos. RE 35,704, 5,711,589, and 5,863,113) which replaces the conventionally used crossed ridge sheets. The prism bending sheet has the surface containing the structure directed towards the backlight unit whereas the ridge sheets have the structured surfaces directed away from the backlight unit. The prism bending sheet redirects the light which exits the light guide into a direction normal to the light guide where surface texture or microstructure variation along the light guide on the bottom surface is used to produce a uniform light distribution. Kalantar et al., SID '00 Digest pp. 1029–1031 describes that by forming ridges along one major surface of the light guide perpendicular to the axis of the CCFL, the output light can be collimated in the direction across the guide (where across the guide is perpendicular to along the guide which is perpendicular to the axis of the CCFL). It was noted that the output light distribution could be varied by changing the apex angle of the ridges formed on the light guide. The use of a bending sheet and ridges on the light guide reduces the number of collimating sheets (ridge or bending sheets) from two to one and the light output from the light guide is more highly collimated. With the conventional approach using two crossed ridge sheets have an apex angle of 90 degrees, the output distribution has a full width half maximum (FWHM) of ±25 deg in both the horizontal and vertical directions.

Figure 1:
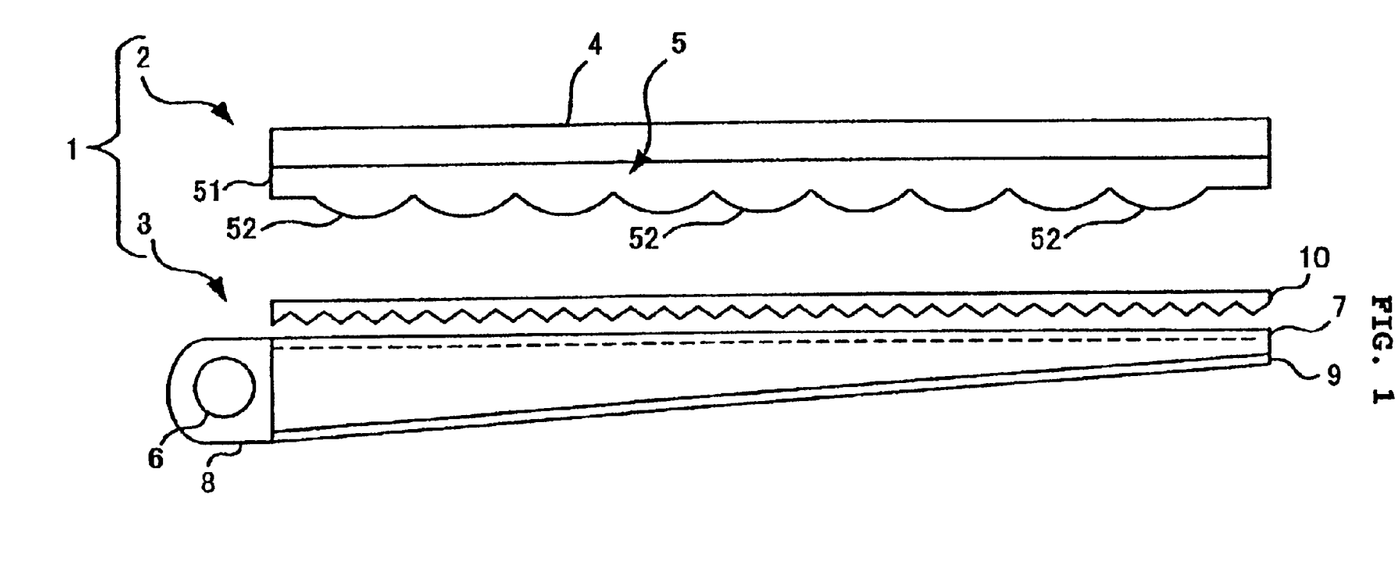
FIG. 1 is a sectional view illustrating components of a liquid crystal display device according to an embodiment of the invention.

Referring now to FIG. 1, a diagram illustrates components of a liquid crystal display device according to an embodiment of the invention. A liquid crystal display device 1 comprises a display unit 2 and a backlight unit 3. The liquid crystal display device 1 is preferably a TFT liquid crystal display panel display device.

The display unit 2 comprises a structure formed by laminating a liquid crystal display panel 4 and a lenticular lens sheet 5. Preferably, the liquid crystal display panel 4 comprises a direct view panel with its upper surface (in the drawing) being an image display screen that comprises a structure formed by laminating an array substrate and a color filter substrate. The array substrate and the color filter substrate are disposed oppositely to each other with a predetermined gap therebetween. A liquid crystal material is sealed in the gap. As is widely known, the liquid crystal display material is used as an optical device for controlling light transmission. On the array substrate, a TFT is formed as a switching device. In addition, on the array substrate, a plurality of scanning lines for supplying scanning signals to the TFT and a plurality of signal lines for supplying display signals to the same are formed in a matrix form. A region surrounded by two scanning lines and two signal lines constitutes a single pixel, and the TFT is disposed in the vicinity of an intersection point of the scanning and signal lines in the pixel. On the array substrate, such pixels are disposed in a dot matrix form.

Figure 2:
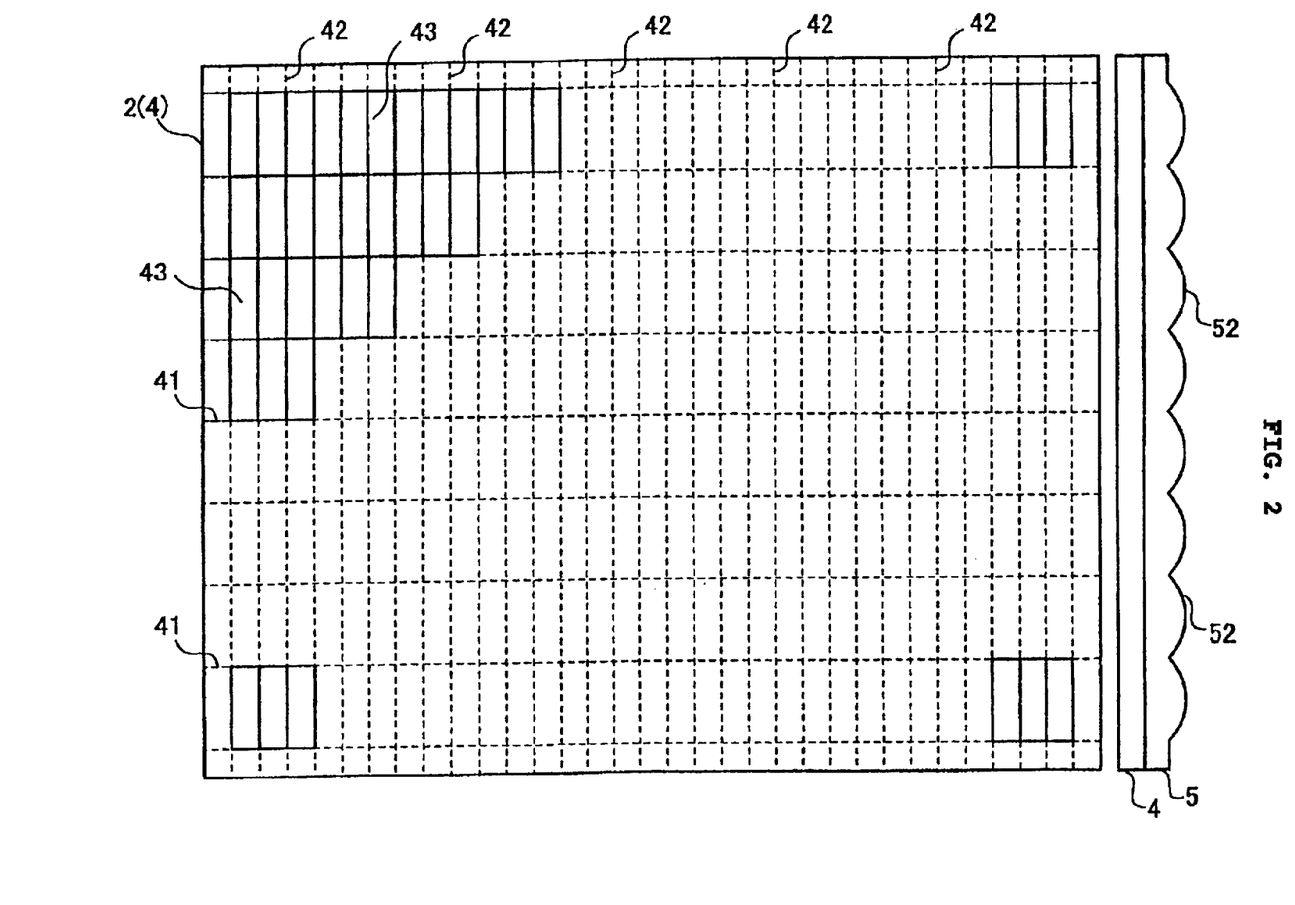
FIG. 2 is a diagram illustrating a relationship of an arrangement between a liquid crystal display panel and a lenticular lens sheet according to an embodiment of the invention.

The lenticular lens sheet 5 is laminated on the liquid crystal display panel 4 by interpolating a polarizing plate. The lenticular lens sheet 5 comprises a structure formed by cyclically arraying a plurality of lenses 52 on a flat plate substrate 51. FIG. 2 illustrates a relationship of the arrangement between the liquid crystal display panel 4 and the lenticular lens sheet 5, according to an embodiment of the present invention. In particular, FIG. 2 shows the plan view of the liquid crystal display panel 4 and the sectional view of the display unit 2 in a corresponding relationship.

As depicted in FIG. 2, each of a plurality of scanning lines 41 is disposed in the horizontal direction of the liquid crystal display panel 4, while each of a plurality of signal lines 42 is disposed in the vertical direction of the same. A region surrounded with a pair of adjacent scanning lines 41 and signal lines 41 and 42 constitutes a pixel 43. In FIG. 2, for ease of understanding, the scanning and signal lines 41 and 42 are represented by dotted lines.

As further depicted in FIG. 2, each lens 52 of the lenticular lens sheet 5 extends along the short side of the pixel 43 (i.e. each pixel comprises a pair of long sides and a pair of short sides). The liquid crystal display panel 4 and the lenticular lens sheet 5 are preferably laminated such that a pitch between scanning lines 41 of the liquid crystal display panel 4 coincides with the pitch between adjacent lenses 52 of the lenticular lens sheet 5. In other words, a boundary between adjacent lenses 52 of the lenticular lens sheet 5 is set to overlap a scanning line 41 of the liquid crystal display panel 4. Most preferably, the lens boundary and the center of the scanning line 41 coincide with each other. Each lens 52 of the lenticular lens sheet 5 is designed to focus on the liquid crystal layer of the liquid crystal display panel 4 when a parallel light is projected. Preferably, since the array and color filter substrates of the liquid crystal display panel 4 are preferably equal in thickness, each lens 52 is designed to focus on the thickness direction center portion of the liquid crystal display panel 4. For a lenticular lens sheet 5, other than the shape and dimension described above, conventionally known specifications may be used.

Figure 3:
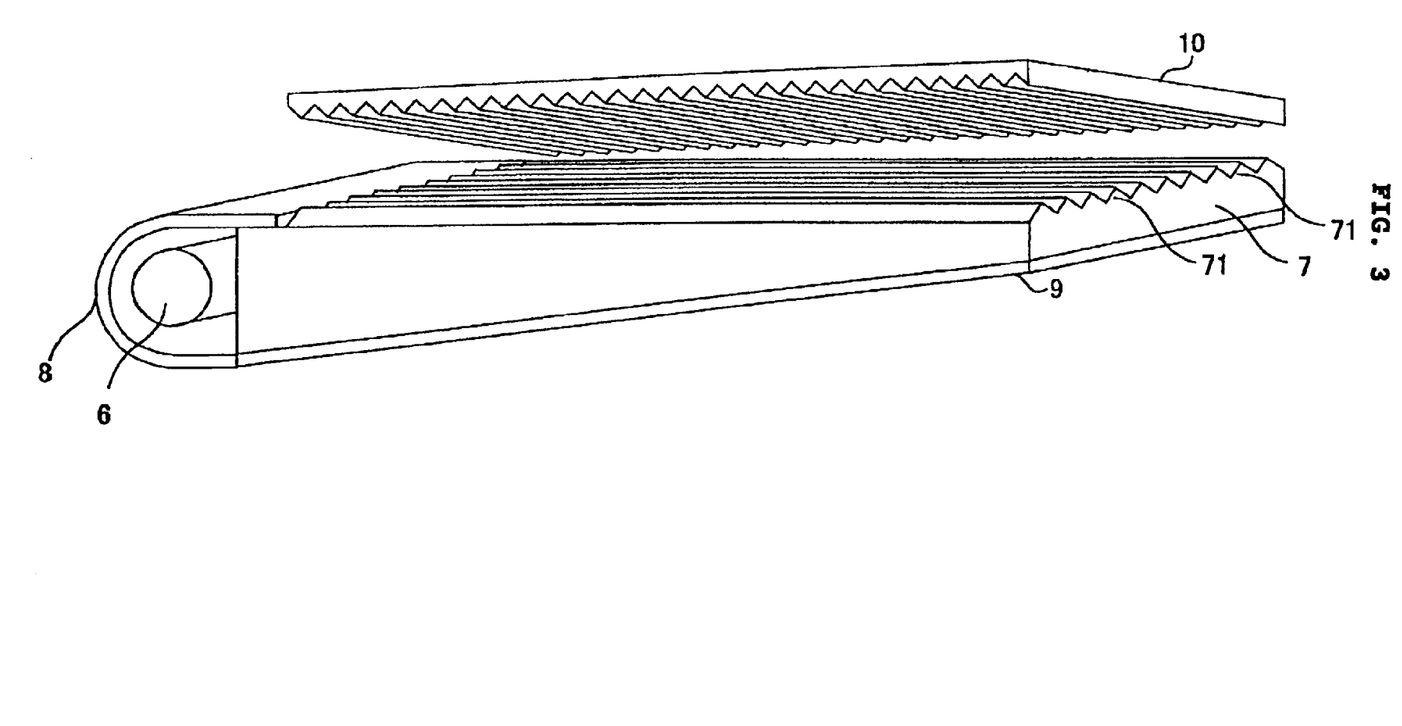
FIG. 3 is an exploded perspective view of a backlight device according to an embodiment of the present invention.

FIG. 3 illustrates an embodiment of the backlight unit 3 according to the present invention. The backlight unit 3 comprises a lamp 6 as a light source, a light guide plate 7 for receiving light emitted from the lamp 6 and emitting light as planar light, a reflector 8 for efficiently supplying the light emitted from the lamp 6 to the light guide plate 7, a reflecting plate 9 disposed in the backside of the light guide plate 7, and a prism sheet 10. According to the invention, the side of the light guide plate 7 facing the display unit 2 is referred to herein as a "surface side" and the opposite side thereof is referred to herein as a "backside".

For the lamp 6, a hot-cathode fluorescent tube or a cold-cathode fluorescent tube may be used. The light guide plate 7 is preferably made of an acrylic resin having a thickness of approximate 2 mm to 3 mm, e.g., polymethyl methacrylate. The surface of the light guide plate 7 facing the lamp 6 is referred to herein as a "light incident surface", and the surface facing the display unit 2 is referred to herein as a "light emission surface". The light emitted from the lamp 6 is made incident on the light incident surface of the light guide plate 7 directly or after being reflected by the reflector 8. The light advancing through the light guide plate 7 by total internal reflection is emitted as planar light directed to the surface side of the light guide plate 7 by the reflecting plate 9 disposed on the backside of the light guide plate 7. The reflector 8 is constructed, for example, by forming a stainless steel plate or a brass plate, by press-machining, into a shape such as shown in the drawing, which is laminated with a PET Film containing sputtered Ag in the inner side thereof. The reflecting plate 9 is formed by coating Ag or Al by vapor deposition (or by sputter) on a PET adhesive tape having a thickness of about 50 micrometers. Alternatively, a white polyester film can be used.

The backlight unit 3 is preferably adapted to increase the degree of light convergence of light emitted to the display unit 2. In a preferred embodiment, a prism array 71 is formed on the surface side of the light guide plate 7, and a prism sheet 10 is disposed on the surface side of the light guide plate 7. The prism sheet 10 is thus disposed between the light guide plate 7 and the display unit 2.

The prism array 71 is preferably formed on the light guide plate 7 such that the ridgeline of the prism array 71 is orthogonal to the lamp 6. In other words, the prism array 71 is formed in a direction parallel to the advancing direction of light in the light guide plate 7. As described in further detail below, an apex angle of the prism array 71 is preferably set in the range of about 70 degrees to about 130 degrees. The prism array 71 may be disposed either in the upper surface or in the lower surface of the light guide plate 7. Further, the prism sheet 10 may have the prism formed in its upper surface.

In the embodiment of FIG. 3, the prism sheet 10 comprises a prism formed in its lower surface such that the ridgeline of the prism is parallel to the lamp 6. In other words, the prism of the prism sheet 10 is formed in a direction perpendicular to the light advancing direction in the light guide plate 7. An apex angle of the prism sheet 10 is preferably set in the range of about 60 degrees to about 75 degrees. In the backlight unit 3, the prism array 71 formed in the light guide plate 7 functions to converge light into a direction parallel to the lamp 6, and the prism sheet 10 functions to redirect light in a direction perpendicular to the lamp 6. However, the light convergence by the prism sheet 10 is directed to light emitted from the above-noted light emission surface because of breakage of total internal reflection caused by the wedge shape of the light guide plate 7.

To evaluate the degree of light convergence, maximum luminance is set in the center portion, and an angle at which luminance is half of the maximum luminance (referred to as half-value width, hereinafter) is used as an index. As the half-value width becomes smaller, the degree of light convergence is greater. A half-value width of the backlight unit 3 of the embodiment was measured, and found to be ±10 degrees. In contrast, the measured half-value width of a conventional backlight unit was found to be about ±25 degrees. Accordingly, a backlight unit 3 according the present invention was found to have a considerably increased light converging degree.

More specifically, optical simulations were performed with an Acrylic 0.55 deg tapered light guide with a flat entrance edge, a flat bottom surface with a mirror separated from the bottom surface by an air gap and ridges on the top surface with a mirror separated from the bottom surface by an air gap and ridges on the top surface perpendicular to the CCFL axis. If there were no ridges on the top surface, in the TIR direction, the output distribution was centered at 80 degrees from the normal to the light guide with a FWHM of ±4.5 deg and perpendicular to the TIR direction, the output distribution from the light guide centered at 0 degrees with a FWHM of ±47 deg. Note that, as described above, a face down prism bending sheet is preferably used to redirect the output light distribution normal to the display. If the CCFL is along the top or bottom axis of the display, as is now typical, the TIR direction of the light guide corresponds to the vertical direction of the display and the perpendicular to the TIR direction corresponds to the horizontal direction of the display. When there are no ridges on the light guide, the horizontal distribution is greater than desired and the vertical distribution is narrower than desired. The results of a series of optical simulations where the ridge apex angle was varied are shown in the following Table 1 for the conditions described above.

TABLE 1

| Top Ridge Apex | 90 deg | 100 deg | 110 deg | 120 deg | 130 deg | 140 deg |
| --- | --- | --- | --- | --- | --- | --- |
| TIR dir. FWHM | 76 +− 7.5 | 74 +/− 9 | 73 +−/ 9.5 | 76 +/− 8 | 74 +/− 8 | 74 +/− 9.5 |
| ⊥TIR dir. FWHM | 0 +/− 9 | 0 +/− 12 | 0 +/− 16.5 | 0 +/− 20 | 0 +/− 23 | 0 +/− 25 |

With a flat bottom surface, apex angles in the range of about 110 to about 140 degrees provide the preferred light output distribution. The use of a flat bottom surface requires the use of a light redistribution device at the entrance of the light guide to achieve uniform illumination along the guide, such as disclosed in U.S. patent application Ser. No. 09/711,041, filed on Nov. 13, 2000, entitled "Highly Collimating Tapered Guide For Uniform Illumination of Flat Panel Displays," which is commonly assigned and incorporated herein by reference.

Since a high degree of collimation is not required in the present invention, the more typical use of variable density microstructure on the bottom of the light guide to achieve uniform illumination can be implemented. It has been determined through experiments that the use of microstructure on the bottom of the light guide for uniformity, such as 100 micron sized truncated square pyramids wherein the side wall angle was from about 20 to about 45 degrees relative to the bottom of the light guide resulted in only a slight increase in the width of the light output distributions, less than about ±5 deg in both directions. This suggests, in Table 1, that suitable apex angles for the ridges are in the range of about 100 to about 130 degrees. As described in U.S. patent application Ser. No. 09/911,988, filed on Jul. 24, 2001, entitled "A light Guide Plate with Prism Structure on Top Surface with a Certain Spacing Between the Prisms", which is commonly assigned and incorporated by reference, if the entire top surface is not covered with ridges, then a smaller apex angle is required to provide the desired output distribution. As described above, the output distribution depends strongly on the design of the ridges along the top (or bottom)

surface. With an appropriate choice of apex angle, the light can be collimated in the vertical direction and have an acceptable output distribution in the horizontal direction. By using a properly designed face down prism bending sheet, the above simulated distributions can be redirected to the display normal.

Figure 4:
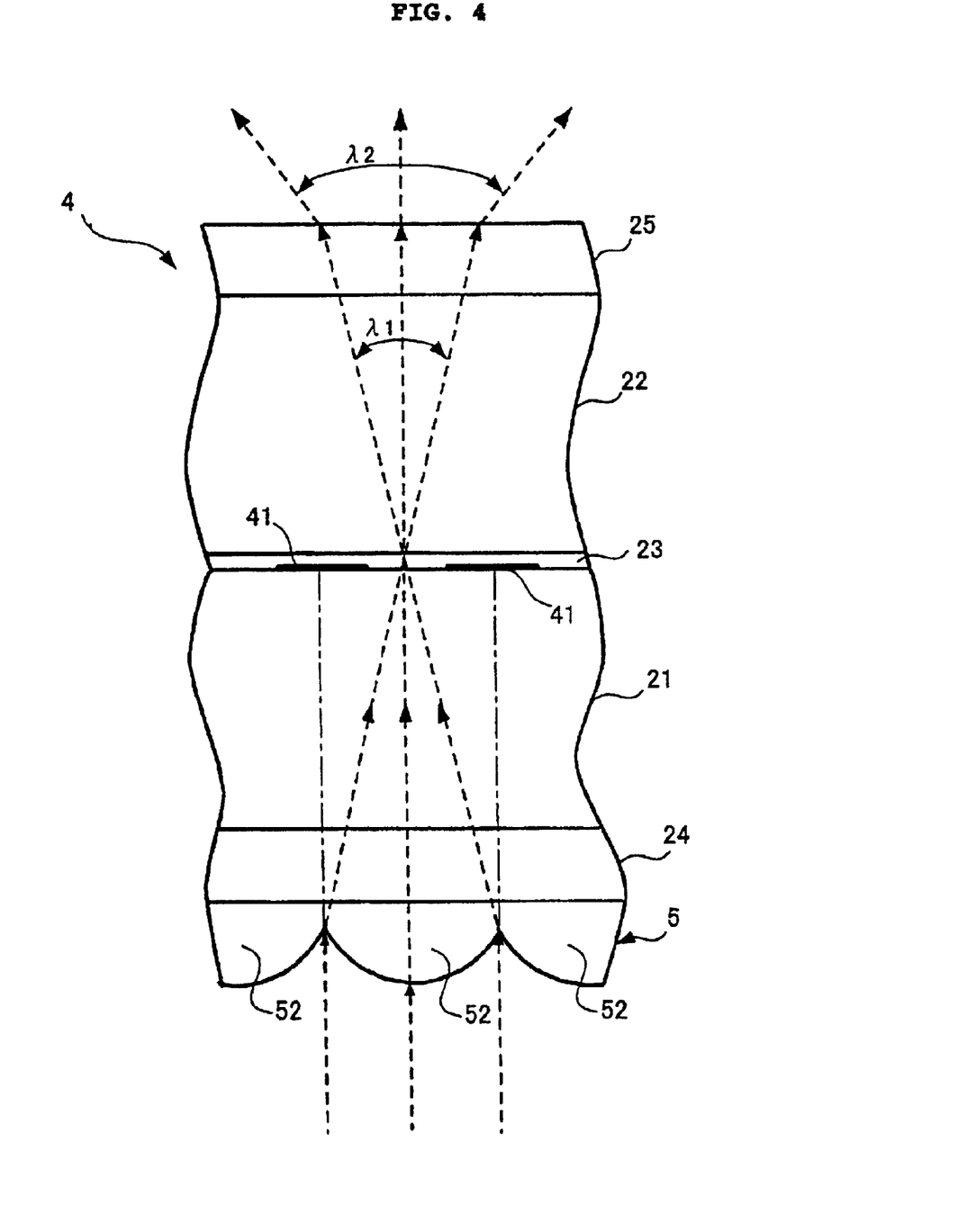
FIG. 4 is a diagram illustrating a light transmission path through a liquid crystal display device according to an embodiment of the invention.

Referring now to FIG. 4, a diagram illustrates a light transmission path through a liquid crystal display device according to an embodiment of the invention. In particular, FIG. 4 is a schematic sectional view showing a light transmission state in the liquid crystal display panel 4 when light is emitted from the backlight unit 3, in the liquid crystal display device 1, according to an embodiment of the invention. The liquid crystal device display pane 4 comprises a structure formed by laminating the lenticular lens sheet 5, a polarizing plate 24, an array substrate 21, a liquid crystal layer 23, a color filter substrate 22, and a polarizing plate 25. A scanning line 41 is formed on the array substrate 21. As noted above, the lenticular lens sheet 5 is preferably disposed such that the width direction center of the scanning line 41 coincides with a boundary between adjacent lenses 52 of the lenticular lens sheet 5. In addition, as described above, each lens 52 of the lenticular lens sheet 5 is designed to focus on the liquid crystal layer 23.

FIG. 4 illustrates the irradiation to the lenticular lens sheet 5 with parallel lights (indicated by dotted lines) emitted from the backlight unit 3. The light projected to a lens 52 of the lenticular lens sheet 5 is preferably converged to a focal point located in the liquid crystal layer 23. The converged light in the liquid crystal layer 23 advances, after the passage through the focal point, i.e., the liquid crystal layer 23, through the color filter substrate 22, while being diffused with a radiation angle $\lambda_1$. When the light is emitted from the polarizing plate 25 after the passage through the color filter substrate 22, a radiation angle thereof becomes $\lambda_2$, which is larger than $\lambda_1$. Specifically, since the color filter substrate 22 and the polarizing plate 25 have refractive indices of about 1.5, the radiation angle $\lambda_2$ of the light passed through the color filter substrate 22 and emitted from the polarizing plate 25 is larger than the radiation angle $\lambda_1$ during the passage through the color filter substrate 22 and the polarizing plate 25. Thus, in a liquid crystal display device 1 according to an embodiment of the invention, it is advantageously possible to secure predetermined brightness without using diffusing plates even when the liquid crystal display panel 4 is viewed from an oblique direction.

Figure 8:
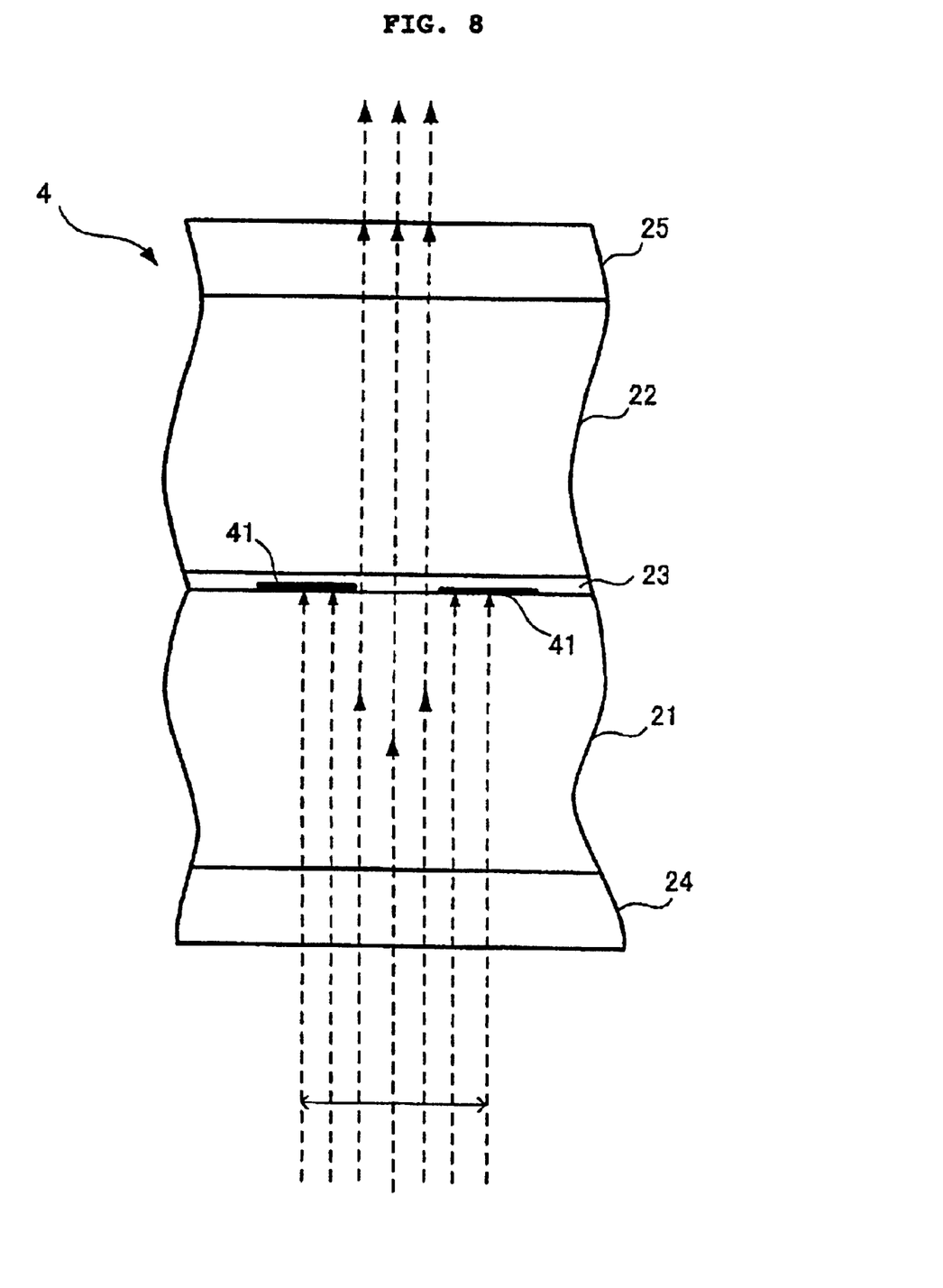
FIG. 8 is a diagram illustrating a light transmission path through a liquid crystal display device that does not comprise a light focusing device.

FIG. 8 illustrates a light transmission path through a liquid crystal display panel when the lenticular lens sheet 5 is not provided. The components of the LCD display in FIG. 8 which are similar to those in FIG. 4 are denoted by like reference numerals. In the exemplary diagram of FIG. 8, a portion of light that is made incident in the polarizing plate 24 is blocked by the scanning line 41. The other portions of the light that are not blocked are passed through the color filter substrate 22 and the polarizing plate 25. However, because these portions of the light are emitted perpendicularly to the surface of the polarizing plate 24, the effect of widening the radiation angles (widening the viewing angle) is not achieved.

In addition to the advantage of securing predetermined brightness without using diffusing plates, a liquid crystal display device according to the invention has an advantage of increasing luminance as compared with the conventional liquid crystal display device. Indeed, in the conventional liquid crystal display device having no lenticular lens sheet 5, as shown in FIG. 8, a portion of light advancing in the array substrate 21 is blocked by the scanning line 41, the signal line 42 or the like formed on the array substrate 21. In other words, the scanning line 41, the signal line 42 or the like formed on the array substrate 21 reduce the light transmissivity of the liquid crystal display panel 4. On the other hand, in a liquid crystal display device according to the present invention (such as shown in FIG. 4), the light made incident on the liquid crystal display panel 4 is converged between the scanning lines 41 and 41 by the lenticular lens sheet 5 and, consequently, no portion of the transmitted light is blocked by the scanning lines 41. In practice, there is a possibility of the light being blocked by a scanning line 41 because of a manufacturing error or the like. In such a case, however, the amount of blocked light is very small compared with that in the case of the conventional liquid crystal display device. Advantageously, in a liquid crystal display device according to the invention, the degree of convergence of light emitted from the backlight unit 3 is increased by virtue of the prism array 71 in the light guide plate 7 and the prism sheet 10. Those elements reduce the possibility that light is blocked by scanning lines 41.

Preferably, the degree of convergence is preferably set in the half-value width range of about −15 degrees to about −5 degrees or in the range of about 5 degrees to about 15 degrees. If a half-value width is greater than 15 degrees or less than −15 degrees, then the converging degree may become too broad such that portions of the transmitted light will be blocked by the scanning lines. If a half-value width is greater than −5 degrees and less than 5 degrees, then the converging degree may become too high to secure a sufficient radiation distribution of light emitted from the polarizing plate 25.

Further, the half-value width of light emitted from the polarizing plate 25 is preferably set in the range of about −30 degrees to about −15 degrees or in the range of about 15 degrees to about 30 degrees. If the half-value width is greater than 15 degrees or less than −15 degrees, then a shortage occurs in brightness when seen from a wide angle. If it is greater than 30 degrees or less than −30 degrees, then a shortage occurs in front brightness.

As described above, in a liquid crystal device according to an embodiment of the invention, the lenticular lens sheet 5 is disposed in a predetermined position on the liquid crystal display panel 4. Accordingly, it is possible to obtain an emitted light having a predetermined expanse without providing a diffusing plate. Moreover, the luminance is increased by preventing light blockage by the scanning lines 41 on the array substrate 21.

Figure 5:
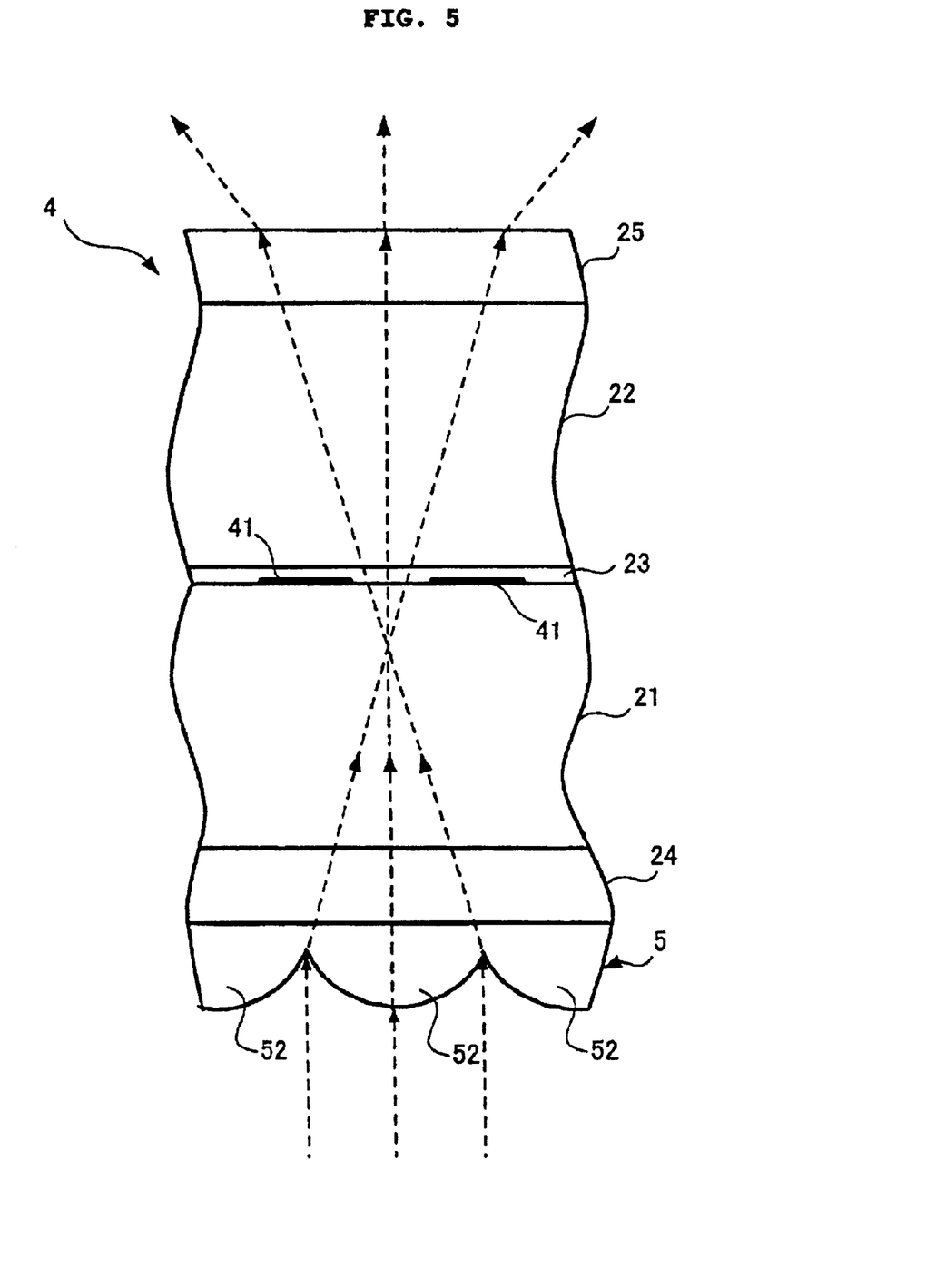
FIG. 5 is a diagram illustrating another light transmission path through a liquid crystal display device according to an embodiment of the invention.

In the exemplary diagram of FIG. 4, the focal point of a lens 52 of the lenticular lens sheet 5 is located in the liquid crystal layer 23. It is to be appreciated, however, that the invention is not limited as such and the focal point of converged light may be located in other areas. For example, as shown in FIG. 5, the lens 52 may be designed to focus inside the array substrate 21. As can be understood from FIG. 5, even if the focal point of the lens 52 is located inside the array substrate 21, an advantage similar to that of the liquid crystal display device 1 shown in FIG. 4 can be provided.

Figure 6:
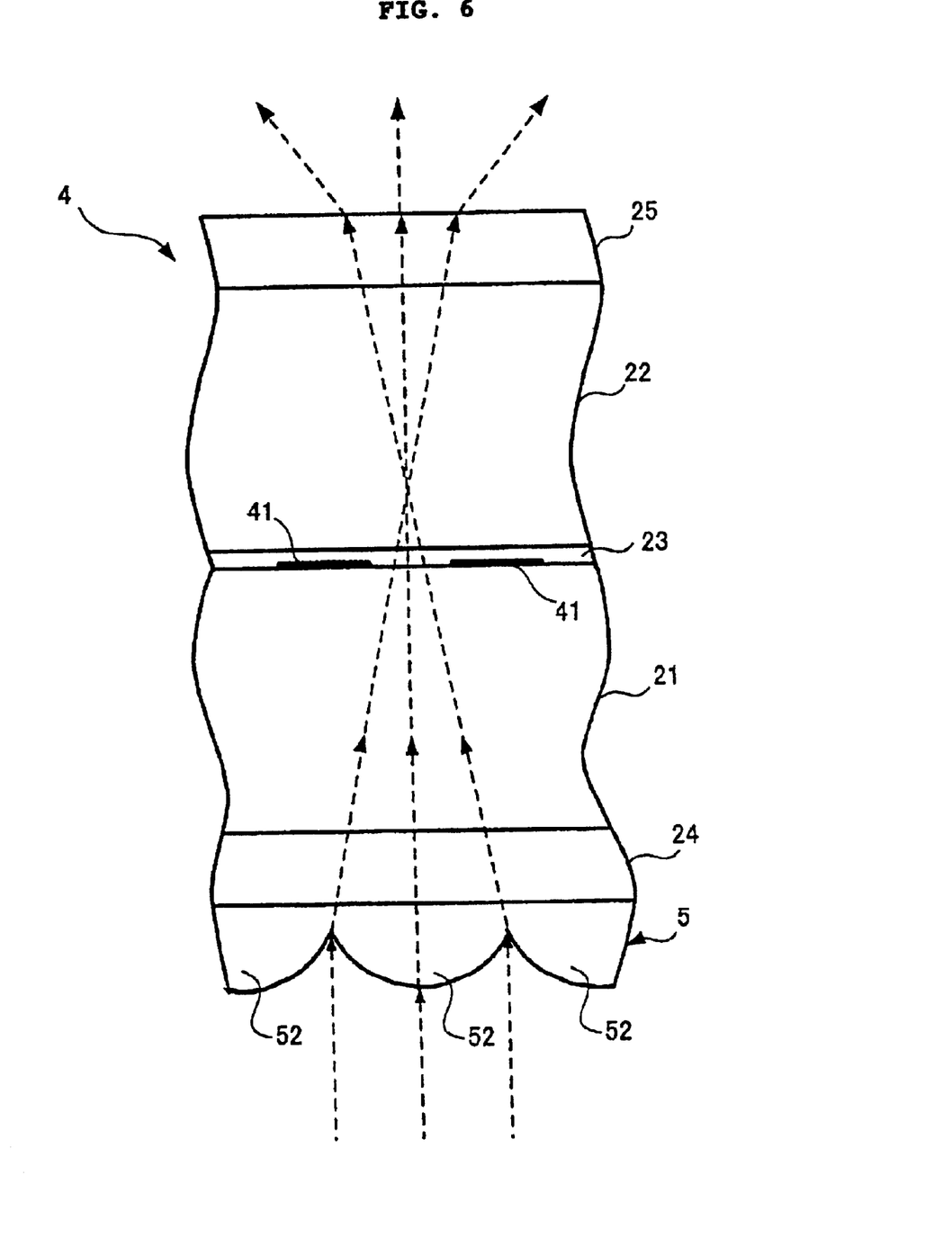
FIG. 6 is a diagram illustrating another light transmission path through a liquid crystal display device according to an embodiment of the invention.

In addition, as shown in FIG. 6, the focal point of the lens 52 can be located inside the color filter substrate 22. In such a case, as can be understood from FIG. 6, an advantage similar to that of the liquid crystal display device 1 shown in FIG. 4 can also be provided.

Further, in the exemplary diagram of FIG. 4, the boundary line between adjacent lenses 52 of the lenticular lens sheet 5 coincides with the width direction center of adjacent scanning lines 41. Although the mode depicted in FIG. 4 is most preferable, it is not essential for obtaining the advantages of the present invention.

Figure 7:
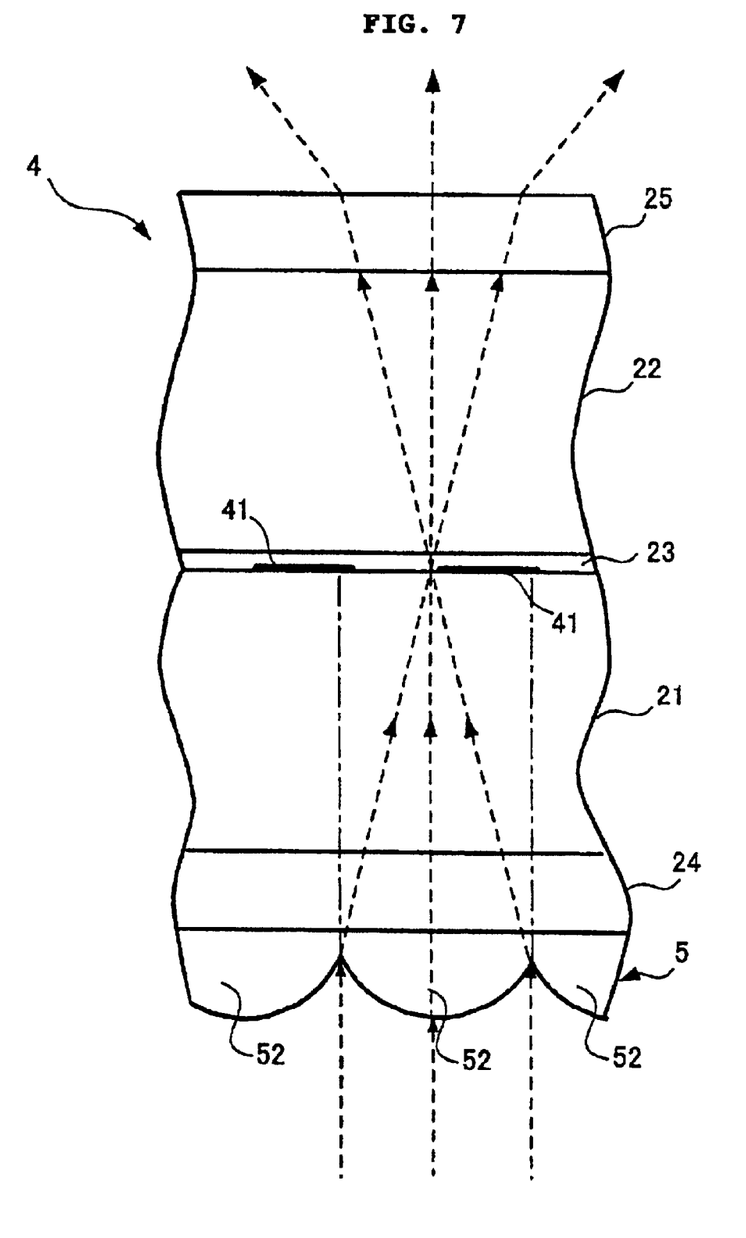
FIG. 7 is a diagram illustrating another light transmission path through a liquid crystal display device according to an embodiment of the invention.

For example, as depicted in FIG. 7, even if there is deviation between the boundary line of adjacent lenses 52 and the width direction center of the scanning lines 41, as long as the focal point of the lens 52 is present between the adjacent scanning lines 41, i.e., within the projection surface range of the pixel 43, the advantages of increase luminance and wider viewing angle can still be obtained. It is only when the focal point of the lens 52 is within the projection surface of the scanning line 41 that light, which is passed through the lens 52, is blocked, thereby reducing luminance.

In the exemplary embodiments described herein, the lenticular lens sheet 5 is depicted as being disposed in the lower surface of the polarizing plate 24. It is to be appreciated, however, the lenticular lens sheet 5 can be disposed between the array substrate 21 and the polarizing plate 24. In this case, however, the lenticular lens sheet 5 must not cancel polarization by the polarizing plate 24. It has been determined that no such polarization cancellation occurs if the lenticular lens sheet 5 is made of an ultraviolet curing resin, and the polarized light is made incident in parallel with the axial direction of the lens 52 thereof. In other words, it is only necessary to make the polarizing direction of the polarizing plate 24 coincident with the axial direction of the lens 52.

Moreover, in a liquid crystal display device according to the present invention, the lenses 52 of the lenticular lens sheet 5 are preferably formed to correspond to the column of the pixels 43 along the short sides thereof. However, the lenses 52 can be formed corresponding to the row of the pixels 43 along the long sides thereof. Generally, however, in a liquid crystal display panel, the gap between adjacent signal lines 42 is only ⅓ of the gap between adjacent scanning lines 41. Consequently, if the lenticular lens sheet 5 is disposed to correspond to the row of the pixels 43, there may be a manufacturing difficulty. Thus, in a preferred embodiment, the lenses 52 of the lenticular lens sheet 5 are formed to correspond to the column of the pixels 43 along the short sides thereof.

Accordingly, as described above, the present invention provides liquid crystal display panels and a liquid crystal display devices that are capable of improving luminance and emitting light having a wide radiation distribution. Although illustrative embodiments have been described herein with reference to the accompanying drawings, it is to be understood that the present invention is not limited to those precise embodiments, and that various other changes and modifications may be affected therein by one or ordinary skill in the art without departing from the scope or spirit of the invention. All such changes and modifications are intended to be included within the scope of the invention as defined by the appended claims.

What is claimed is:

1. A liquid crystal display panel, comprising:
an array substrate comprising rectangular pixels in a matrix form, each of the pixels comprising a pair of long sides and a pair of short sides, wherein a gap between a pair of short sides of the pixel is in a range of about 100 micrometers to about 300 micrometers;
a color filter substrate;
a liquid crystal layer disposed between the array substrate and the color filter substrate; and
a plurality of lenticular lenses extending along the short sides of the pixels for converging light to desired locations within the LCD panel, wherein the lenticular lenses are disposed on a surface side of the array substrate that receives light from a light source and wherein the lenticular lenses are disposed such that a boundary between adjacent lenticular lenses is substantially arranged along the short sides of pixels.

2. The liquid crystal display panel of claim 1, wherein a focal point of each of the lenticular lenses is within the liquid crystal layer.

3. The liquid crystal display panel of claim 1, wherein each of the lenticular lenses focuses within a range of projection surfaces of the pixels.

4. A liquid crystal display device comprising:
a liquid crystal display panel comprising a liquid crystal layer and an image display screen;
a light source for emitting a light to the liquid crystal display panel, wherein a half-value width of the light emitted from the light source is in a range of about −15 degrees to about −5 degrees or in the range of about 5 degrees to about 15 degrees; and
a lens disposed between the liquid crystal display panel and the light source for converging the light emitted from the light source inside the liquid crystal display panel, wherein the light emitted from the light source is converged inside the liquid crystal display panel, then diffused with a first angle, and emitted from the image display screen with a second angle that is greater than the first angle.

5. The liquid crystal display device of claim 4, wherein the lens converges the light emitted from the light source within the liquid crystal layer or in proximity thereto.

6. The liquid crystal display device of claim 4, wherein a half-value width of the light emitted from the image display screen is greater than the half-value width of the light emitted from the light source.

7. A liquid crystal display device comprising:
a liquid crystal display panel comprising a liquid crystal layer and an image display screen;
a light source for emitting a light to the liquid crystal display panel wherein a half-value width of the light emitted from the image display screen is in a range of about −30 degrees to about −15 degrees or in a range of about 15 degrees to about 30 degrees; and
a lens disposed between the liquid crystal display panel and the light source for converging the light emitted from the light source inside the liquid crystal display panel, wherein the light emitted from the light source is conversed inside the liquid crystal display panel, then diffused with a first angle, and emitted from the image display screen with a second angle that is greater than the first angle.

8. A liquid crystal display device, comprising:
a liquid crystal display panel comprising an array substrate comprising a plurality of signal lines for supplying display signals and a plurality of scanning lines for supplying scanning signals, wherein the signal and scanning lines are arrayed in a matrix form, a color filter substrate disposed oppositely to the array substrate with a predetermined gap therebetween, and a liquid crystal layer disposed in the gap;
a light guide plate, disposed in a backside portion of the liquid crystal display panel, comprising at least one light incident surface and a light emission surface for emitting a light made incident from the light incident surface;
a lamp disposed along the light incident surface of the light guide plate; and a plurality of lenticular lenses disposed between the light guide plate and the liquid crystal display panel and extending in a direction parallel to the scanning lines wherein an arraying pitch of the lenticular lenses coincides with a pitch of the scanning lines.

9. The liquid crystal display device of claim 8, wherein the light emission surface of the light guide plate comprises a plurality of prisms that extend in a direction parallel to a light advancing direction in the light guide plate, and wherein the liquid crystal display device further comprises a prism sheet, disposed between the light guide plate and the lenticular lenses, comprising a plurality of prisms that extend in a direction perpendicular to the light advancing direction in the light guide plate.

10. A method for illuminating a display panel, comprising the steps of:

generating light from a light source;

converging the light to a focal point within the display panel such that the light passes through open area surfaces of pixels of the display panel;

diffusing the converged light at a first angle through the display panel;

emitting the diffused light from the display panel with a second angle, wherein the second angle is greater than the first angle; and collimating the light emitted from the light source in a direction in which the light is converged such that a width of a region of the converged light is less than a gap between adjacent scanning lines comprising a pixel.

* * * * *